(12) United States Patent
Suzuki et al.

(10) Patent No.: US 8,088,336 B2
(45) Date of Patent: Jan. 3, 2012

(54) REDUCING GAS GENERATOR AND SOLID REDUCTANT SCR SYSTEM HAVING THE GENERATOR

(75) Inventors: Kazunori Suzuki, Nagoya (JP);
Masatoshi Kuroyanagi, Kariya (JP);
Yoshiaki Nishijima, Toyokawa (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 914 days.

(21) Appl. No.: 12/076,482

(22) Filed: Mar. 19, 2008

(65) Prior Publication Data
US 2008/0260597 A1  Oct. 23, 2008

(30) Foreign Application Priority Data

Apr. 23, 2007  (JP) ................... 2007-113439

(51) Int. Cl.
*C01C 1/02* (2006.01)
(52) U.S. Cl. ........ 422/148; 422/164; 422/166; 422/168; 422/172; 422/307
(58) Field of Classification Search .................. 422/148, 422/164, 165, 166, 168, 172, 305, 307; 60/295
See application file for complete search history.

(56) References Cited

U.S. PATENT DOCUMENTS

| | | | | |
|---|---|---|---|---|
| 2,816,419 A | * | 12/1957 | Mueller | 60/671 |
| 4,963,332 A | * | 10/1990 | Brand et al. | 423/235 |
| 6,387,336 B2 | * | 5/2002 | Marko et al. | 423/212 |
| 6,399,034 B1 | * | 6/2002 | Weisweiler | 423/213.2 |
| 2005/0274108 A1 | | 12/2005 | Schulte et al. | |
| 2007/0035832 A1 | | 2/2007 | Hirata et al. | |

FOREIGN PATENT DOCUMENTS

| JP | 02-163406 | 6/1990 |
|---|---|---|
| JP | 2001-159308 | 6/2001 |
| JP | 2005-282413 | 10/2005 |

OTHER PUBLICATIONS

Krüger et al., "A Compact Solid SCR System", *MTZ Worldwide*, vol. 64, Jun. 2003, pp. 14-17.

* cited by examiner

*Primary Examiner* — Jill Warden
*Assistant Examiner* — Joye L Woodard
(74) *Attorney, Agent, or Firm* — Nixon & Vanderhye PC

(57) ABSTRACT

A reducing gas generator generates reducing gas including ammonia. The generator includes a solid reductant and a heat-generating portion. The solid reductant is formed in a columnar shape. A cross-sectional surface of the solid reductant has a constant shape and is perpendicular to a central axis of the solid reductant. The heat-generating portion includes a heat-generating surface opposed to a lower surface of the solid reductant in a vertical direction thereof and in contact with an entire region of the lower surface, and a heating element that heats the heat-generating surface when energized, so that the solid reductant is heated and decomposed to generate the reducing gas.

15 Claims, 7 Drawing Sheets

$$V = \frac{R_2}{R_1 + R_2} V_0$$

REDUCING GAS GENERATOR AND SOLID REDUCTANT SCR SYSTEM HAVING THE GENERATOR

CROSS REFERENCE TO RELATED APPLICATION

This application is based on and incorporates herein by reference Japanese Patent Application No. 2007-113439 filed on Apr. 23, 2007.

BACKGROUND OF THE INVENTION

1. Field of the Invention

The present invention relates to a reducing gas generator using a solid reductant as a generation source of reducing gas such as ammonia that reduces nitrogen oxide in exhaust gas and to a solid reductant SCR system having the reducing gas generator.

2. Description of Related Art

An SCR (selective catalytic reduction) system is of use in a whole range of fields as a means for removing nitrogen oxide in exhaust gas. In the SCR system, nitrogen oxide in exhaust gas reacts selectively with reducing gas such as ammonia by catalysis and is thereby reduced to harmless nitrogen. When nitrogen oxide in exhaust gas discharged from a large-scale plant such as a thermal power plant is treated, ammonia stored in a high-pressure tank is directly conducted to the SCR system. When nitrogen oxide in exhaust gas discharged from a small-scale internal-combustion engine such as an automotive engine is treated, an ammonia aqueous solution or urea aqueous solution is used as an ammonia generation source which is installed in a vehicle and safe and secure in handling, as described, for example, in JP2005-282413A corresponding to US2007/0035832A1.

However, when the above aqueous solutions are used, their volumetric efficiency is low. Ammonia that is used effectively for exhaust treatment corresponds to about 30 percent of the volume of the aqueous solution, since solubility of ammonia or urea is limited. Thus, a large amount of aqueous solution is difficult to install in a limited space of the vehicle, and consequently practical realization of the SCR system that treats exhaust gas discharged, for example, from a small-scale automotive engine, is hindered. In addition, there is concern about aqueous solution freeze-up in a low-temperature environment, block in pipes with crystals precipitated out of the aqueous solution, and corroded pipes due to a corrosive aqueous solution.

Accordingly, a solid urea SCR system is proposed in which ammonia gas is conducted into an upstream side of an SCR catalyst disposed in an exhaust flow passage to reduce nitrogen oxide in exhaust gas. The ammonia gas is generated by heating and decomposing solid urea such as ammonium carbamate as an alternative ammonia generation source to the ammonia aqueous solution or urea aqueous solution, as described, for example, in Michael Kruger, et.al, "A Compact Solid SCR System", MTZ worldwide June 2003 vol. 64 pp. 14-17.

In a conventional solid urea SCR system, as shown in FIG. 7, a liquid heating medium 209 such as heat transfer oil heated by a heat exchanger 201 is injected through an injection nozzle disposed under a solid reductant (urea) 208. As a result, a part of the surface of solid urea is instantaneously heated to have sublimation temperature or higher and accordingly a gaseous reductant 207 including a mixture gas of carbon dioxide and ammonia is generated by thermal decomposition. Consequently, the pressure in a space near a lower portion of the solid urea in a container 202 increases. The gaseous reductant 207 is supplied to an upstream side of an SCR catalyst 204 by controlling an amount of the supplied gaseous reductant 207, which is suited to an amount of nitrogen oxide in exhaust gas, through the detection of the above pressure using a pressure sensor 203.

Nevertheless, since a liquid heating medium is used for heating and decomposing the solid urea 208 in the conventional solid urea SCR system, the system requires not only the heat exchanger 201 for heating the solid urea 208, but also a circulation unit, which includes the injection nozzle, an oil tank, and an oil pump 205. The circulation unit injects the heating medium into the solid urea 208, recovers and circulates the heating medium. Furthermore, a mist of the heating medium is mixed in the gaseous reductant 207 and thereby the SCR catalyst 204 may be contaminated. Accordingly, a filter for separating the mist of the heating medium, for example, needs to be provided in a reductant feed pipe 206. Additionally, because the lower surface of the solid urea 208 is locally decomposed by the injection of the heating medium, the lower surface of the solid urea 208 includes both decomposed and undecomposed regions, so that a generation amount of the gaseous reductant 207 may be difficult to control. Also, the solid urea 208 is dissolved in the heating medium, and the solid urea 208 may be precipitated out of the dissolution in a circulation pathway of the heating medium to clog the circulation pathway. Therefore, a reducing gas generator using the solid reductant in the conventional SCR system has a complex structure, and the generation amount of the gaseous reductant 207 is difficult to stabilize.

SUMMARY OF THE INVENTION

The present invention addresses the above disadvantages. Thus, it is an objective of the present invention to provide a reducing gas generator, which has a simplified configuration using a solid reductant having high volumetric efficiency to accurately control generation of reducing gas, and an SCR system having the generator.

To achieve the objective of the present invention, there is provided a reducing gas generator for generating reducing gas including ammonia. The generator includes a solid reductant and a heat-generating portion. The solid reductant is formed in a columnar shape. A cross-sectional surface of the solid reductant has a constant shape, the cross-sectional surface being perpendicular to a central axis of the solid reductant. The heat-generating portion includes a heat-generating surface and a heating element. The heat-generating surface is opposed to a lower surface of the solid reductant in a vertical direction thereof and is in contact with an entire region of the lower surface. The heating element heats the heat-generating surface when energized, so that the solid reductant is heated and decomposed to generate the reducing gas.

To achieve the objective of the present invention, there is also provided a solid reductant SCR system for reducing nitrogen oxide in exhaust gas flowing through an exhaust gas flow passage of an internal combustion engine using the reducing gas so as to remove the nitrogen oxide from the exhaust gas. The system includes an SCR catalyst, the reducing gas generator, and a reducing gas introduced flow control means. The SCR catalyst is disposed in the exhaust gas flow passage. The reducing gas generated by the reducing gas generator is introduced to an upstream side of the SCR catalyst in the exhaust gas flow passage in a flow direction of the exhaust gas. The reducing gas introduced flow control means is for controlling a flow of the reducing gas introduced to the upstream side of the SCR catalyst.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
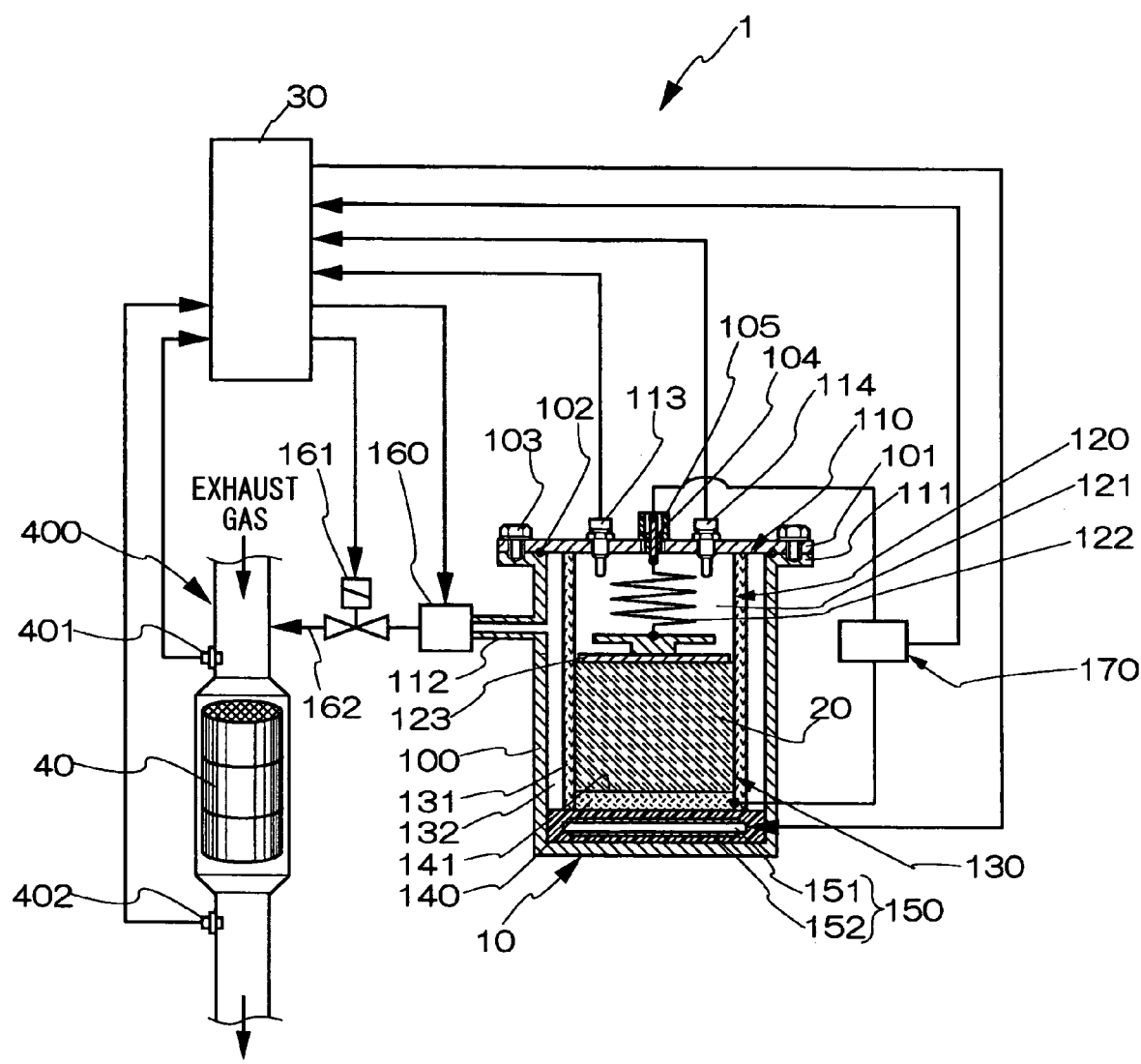
FIG. 1 is a schematic view illustrating an overall configuration of a solid reductant SCR system including a reducing gas generator according to a first embodiment of the invention.

Embodiments of the invention are described below with reference to the accompanying drawings. The present embodiments may be applied to an internal-combustion engine, for example, a diesel engine or a gasoline-burning engine with its exhaust gas including nitrogen oxide (NOx). As shown in FIG. 1, a solid reductant SCR system 1 according to the present embodiments includes a reducing gas generator 10, a solid reductant 20, an electronic control unit (ECU) 30, and an SCR catalyst 40 disposed in an exhaust gas flow passage 400 of an internal-combustion engine (not shown).

The reducing gas generator 10 includes a container 100, a based cylindrical solid reductant receiving portion 130, a heat-generating surface 141, a heat-generating portion 150, the ECU 30, and a solid reductant pressing means 120. The container 100 has an airtight pressure vessel shape. The solid reductant receiving portion 130 receives the solid reductant 20 therein. The heat-generating surface 141 is disposed in contact with a receiving portion base of the solid reductant receiving portion 130 and opposed to a lower surface of the solid reductant 20 to contact its entire region. The heat-generating portion 150 has a heating element 151 that heats the heat-generating surface 141 upon energization. The ECU 30 (control means) controls the energization of the heating element 151. The solid reductant pressing means 120 presses the lower surface of the solid reductant 20 on the heat-generating surface 141 according to reduction in volume of the solid reductant 20 as it is decomposed.

The solid reductant 20 is formed in a columnar shape whose a cross-sectional surface perpendicular to its central axis has a constant shape. Accordingly, a rate of an amount of reducing gas 21 generated by thermal decomposition of the solid reductant 20 with respect to heat release value of the heating element 151 is constant. Thus, the amount of the generated reducing gas 21 is easily controlled, and the reducing gas generator 10 is realized using a simplified configuration. Furthermore, an axial direction of the solid reductant 20 is perpendicular to the heat-generating surface 141, and the solid reductant receiving portion 130 holds a contact position between the solid reductant 20 and the heat-generating surface 141. Accordingly, a contact area between the lower surface of the solid reductant 20 and the heat-generating surface 141 is kept constant, and thereby the amount of the generated reducing gas 21 is even more easily controlled. In addition, the entire region of the lower surface of the solid reductant 20 is constantly pressed against the heat-generating surface 141 by the solid reductant pressing means 120. Consequently, the solid reductant 20 is constantly heated under fixed conditions, and thereby the amount of the generated reducing gas 21 is made stable.

The reducing gas generator 10 further includes a pressure sensor 113, a gas concentration sensor 114, and a solid reductant consumption monitor 170 as information input sources for controlling a reducing gas generation amount accurately. The pressure sensor 113 detects pressure in the container 100. The gas concentration sensor 114 detects the concentration of a specific gas component (ammonia) in the container 100. The solid reductant consumption monitor 170 monitors a consumed amount of the solid reductant 20. By monitoring the consumed amount of the solid reductant 20, the solid reductant 20 is prevented from being used up.

In addition, as output means for controlling the reducing gas generation amount even more accurately, the reducing gas generator 10 includes a control valve 161 in a reducing gas lead-out hole 112 and a press pump 160 between the reducing gas lead-out hole 112 and the control valve 161. The control valve 161 opens and closes the reducing gas lead-out hole 112. The press pump 160 amplifies the pressure of reducing gas that is led out.

Since a positive pressure is maintained in the container 100 by generated reducing gas 21, the supply of the reducing gas 21 to the SCR catalyst 40 is controlled by the opening and closing of the control valve 161 alone. Accordingly, the press pump 160 may be excluded from the reducing gas generator 10.

Exhaust gas discharged from the engine passes through an exhaust-gas aftertreatment device including the solid reductant SCR system 1, and is released into air. The exhaust-gas aftertreatment device includes an oxidation catalyst (not shown), which is disposed before and after the SCR catalyst 40 as a catalyst for purifying NOx in exhaust gas.

The oxidation catalyst before the SCR catalyst 40 converts nitric oxide (NO) in exhaust gas into nitrogen dioxide ($NO_2$) thereby increasing a ratio of $NO_2$ in NOx and homogenizing a stoichiometric mixture ratio of NOx after the SCR catalyst 40. Accordingly, reduction reaction is promoted. At the same time, the oxidation catalyst oxidizes hydrocarbon (HC) and carbon monoxide (CO) in exhaust gas into harmless water ($H_2O$) and carbon dioxide ($CO_2$).

In the SCR catalyst 40, NOx is selectively reduced and purified because of reducing gas. For this reason, a reductant lead-in pipe 162 is connected to a portion between the SCR catalyst 40 and the oxidation catalyst before the SCR catalyst 40. Reducing gas generated in the reducing gas generator 10 is supplied to the portion.

The oxidation catalyst after the SCR catalyst 40 is for restricting the release of surplus ammonia that is not used for reducing NOx in ammonia as reducing gas. The oxidation catalyst oxidizes and decomposes ammonia that has passed through the SCR catalyst 40 to be rendered harmless. The SCR catalyst 40 and the oxidation catalyst after the SCR catalyst 40 may be integrated into a NOx treatment catalyst, or provided separately.

The solid reductant 20 includes at least one of diammonium acid carbonate carbamate $(NH_4)_2(HCO_3)(NH_2CO_2)$, ammonium dihydrogenphosphate $NH_4H_2PO_4$, ammonium acetate $CH_3COONH_4$, ammonium stearate $CH_3(CH_2)_{16}COONH_4$, and ammonium formate $HCOONH_4$. The above solid reductant materials are thermally decomposed at a relatively low temperature, and thereby the reducing gas 21 including ammonia is generated. By forming the solid reductant 20 from the above solid reductant materials in powder form to have a columnar shape through pressure forming such that a cross-sectional surface of the solid reductant 20 perpendicular to its central axis has a given shape, an amount of ammonia gas generated as reducing gas when the solid reductant 20 is heated is easily controlled. Additionally, generally known ammonium carbamate $NH_2COONH_4$, ethyl carbamate $NH_2COOC_2H_5$, ammonium carbonate $(NH_4)_2CO_3$, or ammonium hydrogencarbonate $(NH_4)_2HCO_5$ may be used as the solid reductant 20.

In a case where diammonium acid carbonate carbamate $(NH_4)_2(HCO_3)(NH_2CO_2)$ is used as the solid reductant 20, the solid reductant 20 is thermally decomposed into ammonia ($NH_3$), $H_2O$, and $CO_2$ (formula 1) when the heating element 151 is energized to heat the solid reductant 20 to 70° C. The generated $NH_3$ serves as a reductant for NOx in the SCR catalyst 40 (formula 2). Ammonia gas that has passed through the SCR catalyst 40 without reducing NOx is oxidized and decomposed by the oxidation catalyst after the SCR catalyst 40, thereby purified into harmless $H_2O$ and $CO_2$ (formula 3).

$(NH_4)_2(HCO_3)(NH_2CO_2) \rightarrow 3NH_3+H_2O+2CO_2$ (formula 1)

$NO+NO_2+NH_3 \rightarrow 2N_2+H_2O$ (formula 2)

$4NH_3+3O_2 \rightarrow 2N_2+6H_2O$ (formula 3)

The solid reductant SCR system 1 includes the reducing gas generator 10, the SCR catalyst 40 disposed the exhaust gas flow passage 400 of the engine, and the control valve 161 and the press pump 160 as a reducing gas introduced flow control means for controlling a flow of reducing gas introduced to an upstream side of the SCR catalyst 40 from the reducing gas generator 10. Accordingly, the solid reductant SCR system 1 reduces and removes NOx in exhaust gas from the engine using reducing gas that includes ammonia originating in the solid reductant 20.

Gas concentration sensors 401, 402 for detecting the concentration of the specific gas component in exhaust gas are disposed on upstream and downstream sides of the SCR catalyst 40, respectively. A led-out amount of reducing gas is corrected using the obtained gas concentration.

A chemical formula, heat decomposition temperature, and generated pyrolysis gas of the materials enumerated as an example of the solid reductant 20 are shown in a table 1.

TABLE 1

| material/chemical formula | heat decomposition temperature | composition after heat decomposition |
|---|---|---|
| diammonium acid carbonate carbamate $(NH_4)_2(HCO_3)(NH_2CO_2)$ | 70° C. | $NH_3$ $CO_2$ $H_2O$ |
| ammonium phosphate $(NH_4)_3PO_4$ | 60° C. | $NH_3$ $(NH_4PO_3)_n$ |
| diammonium phosphate $(NH_4)_2HPO_4$ | 216° C. | $NH_3$ $H_2O$ $(NH_4PO_3)_n$ |
| ammonium dihydrogenphosphate $NH_4H_2PO_4$ | 190.5° C. | $NH_3$ $H_2O$ $(NH_4PO_3)_n$ |
| ammonium acetate $CH_3COONH_4$ | 145° C. | $NH_3$ $CO_2$ $H_2O$ |
| ammonium stearate $CH_3(CH_2)_{16}COONH_4$ | 110° C. | $NH_3$ $CO_2$ $H_2O$ |
| ammonium formate $HCOONH_4$ | 180° C. | $NH_3$ $CO_2$ $H_2O$ |

Figure 2A:
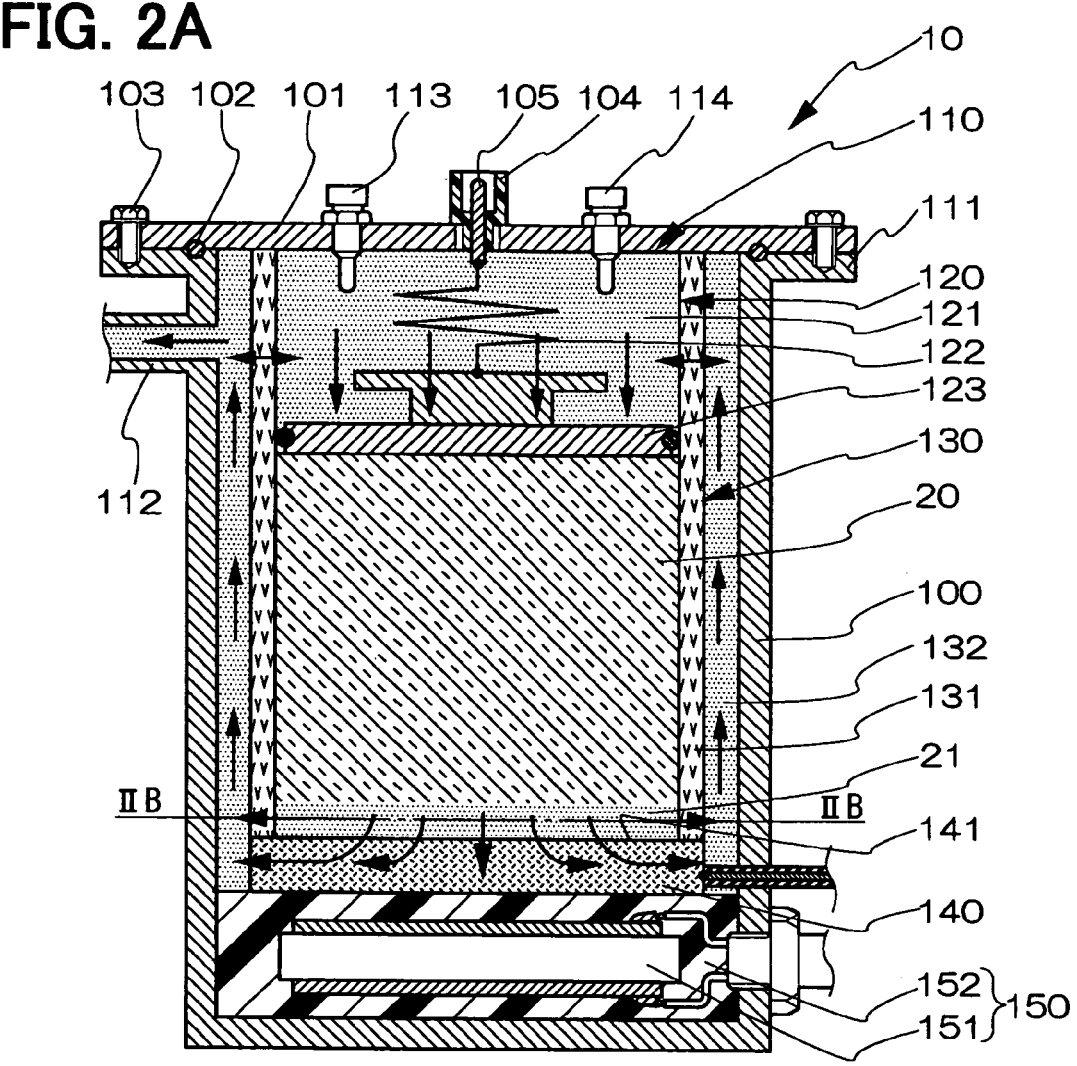
FIG. 2A is a longitudinal sectional view illustrating a main portion of the reducing gas generator according to the first embodiment.
Figure 2B:
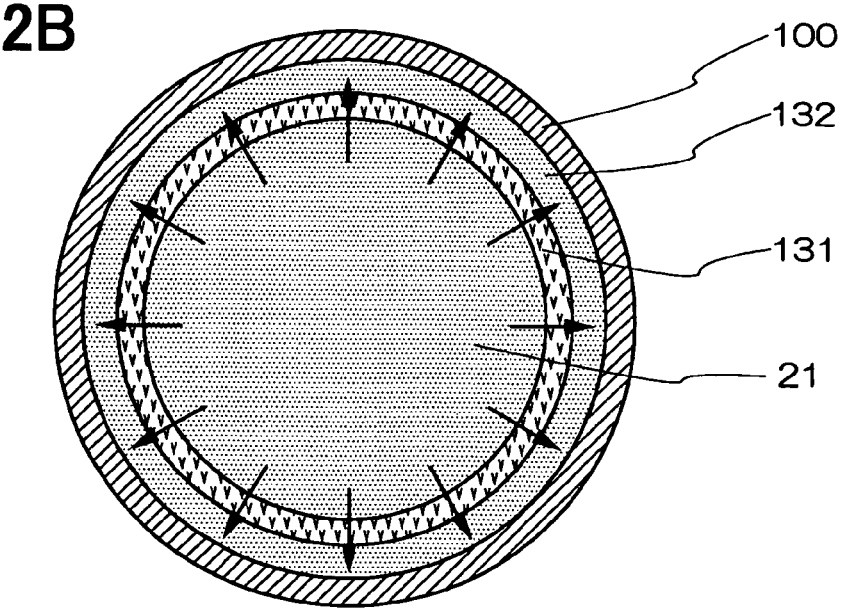
FIG. 2B is a plan view taken along a line IIB-IIB in FIG. 2A.

A specific configuration of the reducing gas generator 10 according to a first embodiment of the invention is described in detail with reference to FIGS. 2A, 2B. FIG. 2A is a sectional view of a main part of the reducing gas generator 10 when the heat-generating portion 150 is generating heat. FIG. 2B is a cross-sectional view taken along a line IIB-IIB in FIG. 2A. In FIGS. 2A, 2B, a flow of the reducing gas 21, which is generated from the solid reductant 20, is indicated by an arrow. The container 100 covers the solid reductant receiving portion 130 and the heat-generating portion 150. The container 100 is formed in a based cylindrical shape with its upper end portion opened and its lower end portion blocked. The container 100 is formed in a hat-like shape having a flanged portion 111 projecting outward around an outer circumferential portion at its upper end. A container cover 101 is formed in a flat plate-like shape and covers an opening 110 of the container 100. The container cover 101 is air-tightly fixed on the flanged portion 111 via a sealing member 102 using a bolt 103. The container 100 and the container cover 101 are formed from stainless steel, for example, and have pressure resistance as a pressure vessel to store the reducing gas 21 generated in the container 100.

The container 100 includes the reducing gas lead-out hole 112 at its upper portion for leading out the reducing gas 21. The solid reductant receiving portion 130 has a ventilation means communicating with a ventilation passage 132, which is located between the solid reductant receiving portion 130 and an inner wall of the container 100 and conducts the reducing gas 21 generated between the heat-generating surface 141 and the lower surface of the solid reductant 20 into the reducing gas lead-out hole 112.

The solid reductant receiving portion 130 receives the solid reductant 20 with the heat-generating surface 141 generally perpendicular to an axial direction of the solid reductant 20, and a position held where the solid reductant 20 and the heat-generating surface 141 are in contact.

A spring gear 122 is attached in the container 100 as one of the solid reductant pressing means 120. One end side of the spring gear 122 presses the solid reductant 20 on the heat-generating surface 141 is electrically connected to an upper electrode 123 that constitutes an electrode of the solid reductant consumption monitor 170. A base end side of the spring gear 122 is connected to a terminal 104. The upper electrode 123 is slidably held on an inner circumferential surface of a solid reductant receiving portion side surface 131. Alternatively, the solid reductant pressing means 120 may use the pressure of gas in a solid reductant back pressure space 121 including the reducing gas 21 conducted into a solid reductant back pressure space 121 for pressing the solid reductant 20. Accordingly, the pressure pressing the solid reductant 20 against the heat-generating surface 141 is equalized, and thereby the amount of the generated reducing gas 21 is made stable.

A surface of a bottom wall of the solid reductant receiving portion 130 opposed to the solid reductant 20 constitutes the heat-generating surface 141. In addition, the ventilation means, through which the reducing gas 21 ventilates, is formed in the bottom wall. Furthermore, the bottom wall constitutes a lower electrode 140 of the solid reductant consumption monitor 170.

As a specific ventilation means, by forming the solid reductant receiving portion side surface 131 and the lower electrode 140 defining the solid reductant receiving portion bottom wall surface from a porous material, through which the reducing gas 21 permeates, the reducing gas 21 generated on the lower surface of the solid reductant 20 ventilates into the ventilation passage 132. Porous sintered metal or porous ceramics may be used for the solid reductant receiving portion side surface 131. A porous sintered metal material or conductive porous ceramics may be used for the lower electrode 140. In addition, when a conductive material is used for the solid reductant receiving portion side surface 131, the solid reductant receiving portion side surface 131 is appropriately insulated from the upper electrode 123 and the lower electrode 140.

A connector 105 maintains air-tightness in the container 100, and the terminal 104 is fixed to the container cover 101, being insulated from the container cover 101 by the connector 105. Also, the connector 105 facilitates a connection of a conductive wire, which is connected to the solid reductant consumption monitor 170, to the upper electrode 123.

A cylinder-shaped hydraulic system, which is vertically displaced by hydrodynamic drive may be attached instead of the spring gear 122. Furthermore, a space defined by an inner wall of the container cover 101, an inner wall of the solid reductant receiving portion 130, and an upper surface of the solid reductant 20 serves as the solid reductant back pressure space 121. The pressure of the reducing gas 21 conducted into the solid reductant back pressure space 121 may be used for pressing the heat-generating surface 141 under the solid reductant 20.

The pressure sensor 113 and the gas (ammonia) concentration sensor 114 are attached to the container cover 101 for detecting a pressure in the solid reductant back pressure space 121 and ammonia concentration, respectively.

The heat-generating portion 150 includes the heating element 151, which generates heat when energized and an insulator 152, which covers the heating element 151. The lower electrode 140 is disposed in close contact with the heat-generating portion 150 for serving as a radiator plate, which transmits heat generated by the heating element 151 from the heat-generating surface 141 evenly to the lower surface of the solid reductant 20.

As shown in FIGS. 2A, 2B, when the heating element 151 generates heat to have a sublimation temperature of the solid reductant 20 and above, the entire lower surface of the solid reductant 20 opposed to the heat-generating surface 141 is heated and decomposed. Then, the generated reducing gas 21 including ammonia permeates the lower electrode 140 and the solid reductant receiving portion side surface 131, and is accordingly conducted into the solid reductant back pressure space 121 through the ventilation passage 132. The reducing gas 21 is conducted out through the reducing gas lead-out hole 112, pressing the solid reductant 20 on the heat-generating surface 141 via the upper electrode 123.

Figure 3A:
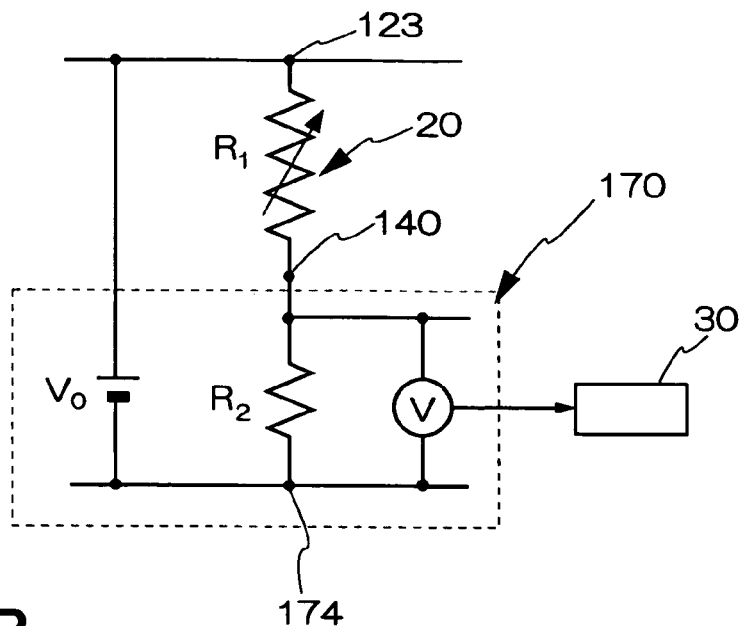
FIG. 3A is an equivalent circuit schematic illustrating a solid reductant consumption monitor applied to the first embodiment.
Figure 3B:
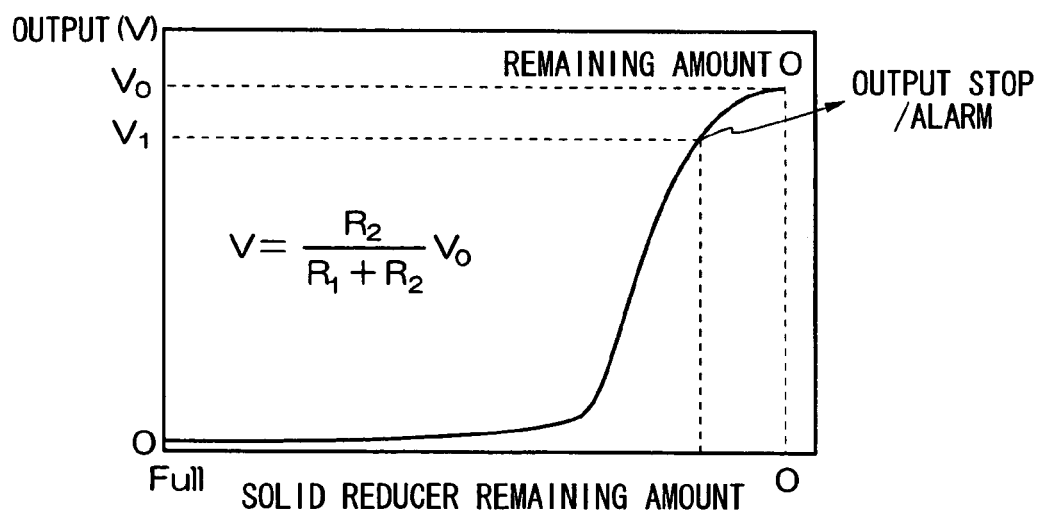
FIG. 3B is a curve illustrating a relationship between a remaining amount of a solid reductant and output voltage according to the first embodiment.
Figure 3C:
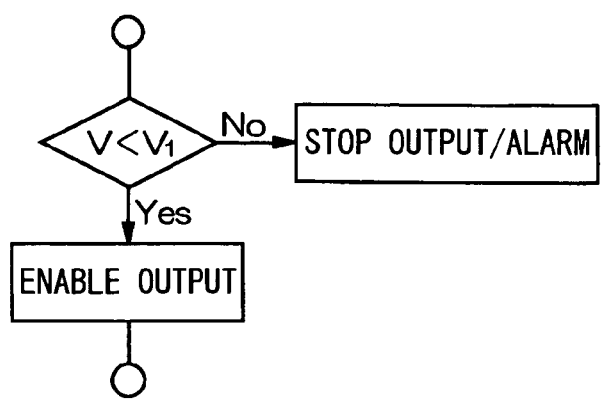
FIG. 3C is a flowchart illustrating workings of the solid reductant consumption monitor according to the first embodiment.

A specific example of the solid reductant consumption monitor 170 is described with reference to FIGS. 3A to 3C. The solid reductant consumption monitor 170 has the upper electrode 123 in contact with the upper surface of the solid reductant 20 and the lower electrode 140 in contact with the lower surface of the solid reductant 20 serving as a pair of electrodes. A known sensing resistor R2 is connected in series to an interelectrode resistance R1 between the pair of electrodes. An output voltage V applied to the sensing resistor R2 between the lower electrode 140 and a connection point 174 is detected when a voltage V0 is applied between the upper electrode 123 and the connection point 174. As shown in FIG. 3B, the interelectrode resistance R1, which varies according to consumption of the solid reductant 20, is obtained from the output voltage V. As shown in a flowchart in FIG. 3C, when the output voltage V is equal to or lower than a threshold value V1, an alarm may be given, or a power supply to the heat-generating portion 150 may be cut off.

Figure 4:
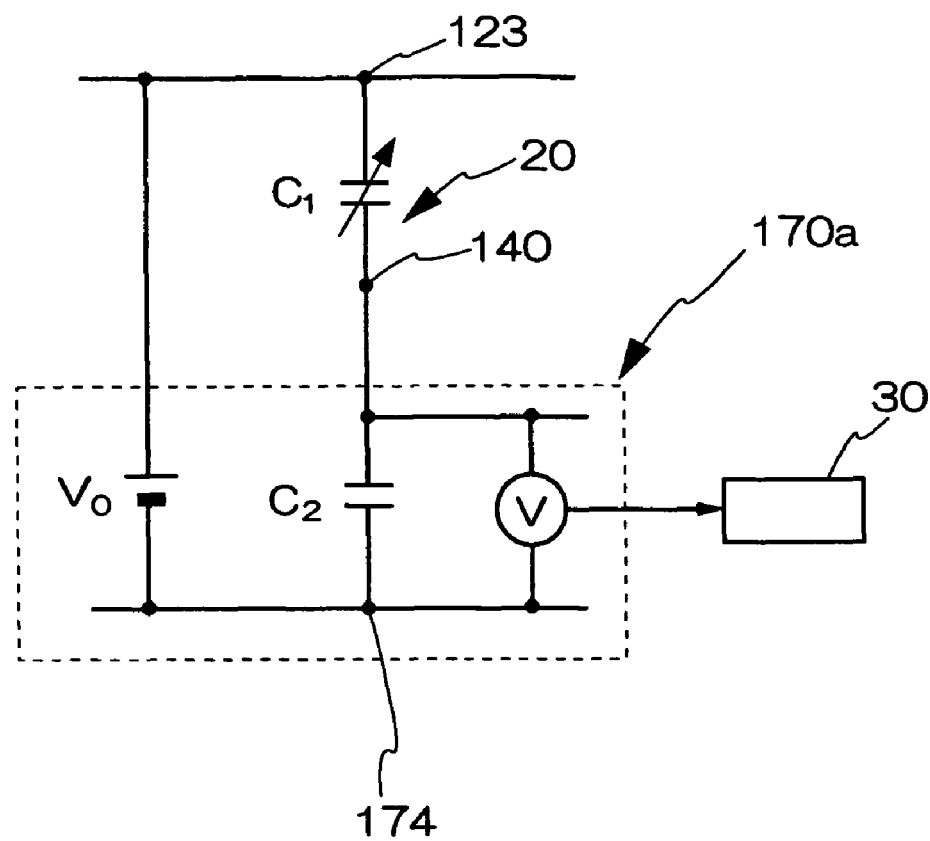
FIG. 4 is an equivalent circuit schematic illustrating another solid reductant consumption monitor applied to according to the first embodiment.

Alternatively, as shown in FIG. 4, a solid reductant consumption monitor 170a may be configured such that a sensing capacitance C2 instead of the sensing resistor R2 is connected in series to the solid reductant 20 and a capacitance C1 is measured instead of the interelectrode resistance R1 between the upper electrode 123 and the lower electrode 140. In addition, the upper electrode 123 also serves as a pressure transmitting member for transmitting the pressure applied by the solid reductant pressing means 120 to the upper surface of the solid reductant 20.

Figure 5A:
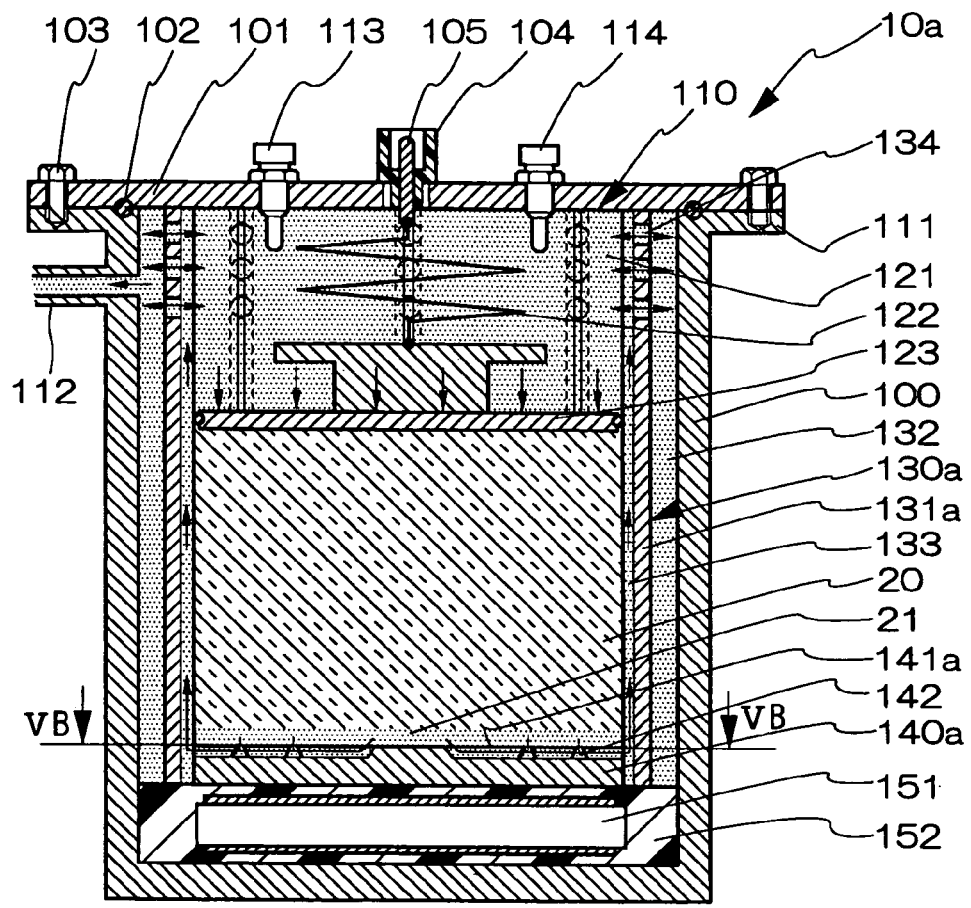
FIG. 5A is a longitudinal sectional view illustrating a main portion of a reducing gas generator according to a second embodiment of the invention.
Figure 5B:
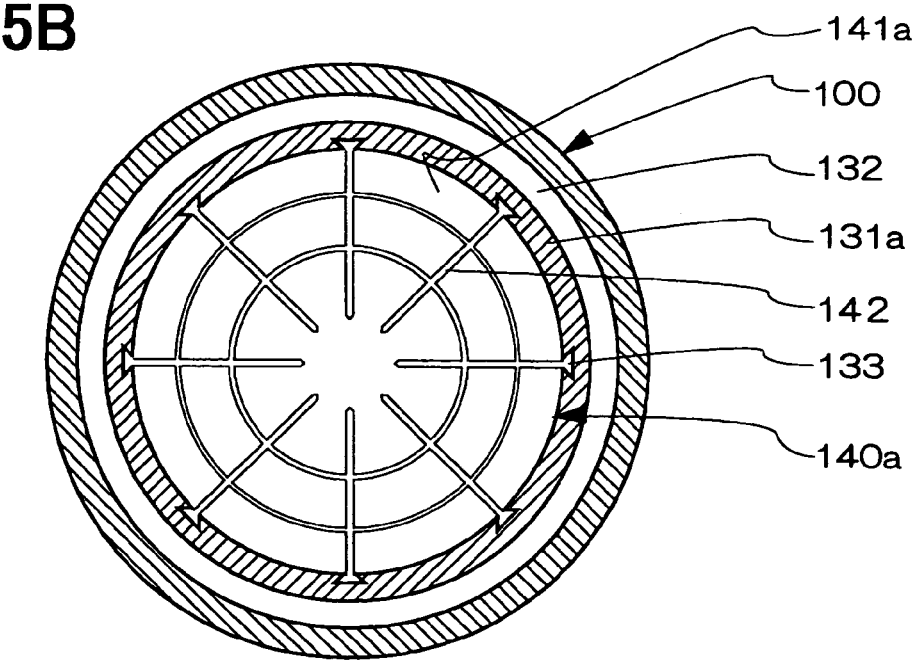
FIG. 5B is a plan view taken along a line VB-VB in FIG. 5A.

As shown in FIGS. 5A, 5B, a specific ventilation means in a reducing gas generator 10a according to a second embodiment of the invention may include a bottom wall groove portion 142, a side wall groove portion 133, and a side surface opening 134. The bottom wall groove portion 142 has at least a single groove formed on an inside surface 141a of a solid reductant receiving portion bottom wall 140a in a radially outward direction from the center of the inside surface 141a. The side wall groove portion 133 has at least a single groove communicating with the bottom wall groove portion 142 and formed on an inner circumferential surface of a solid reductant receiving portion side wall 131a in a direction from its lower to upper end. The side surface opening 134 is formed at an upper portion of a solid reductant receiving portion 130a and connected to the side wall groove portion 133. Accordingly, the inside and outside of the solid reductant receiving portion side wall 131a communicate through the side surface opening 134.

Figure 6A:
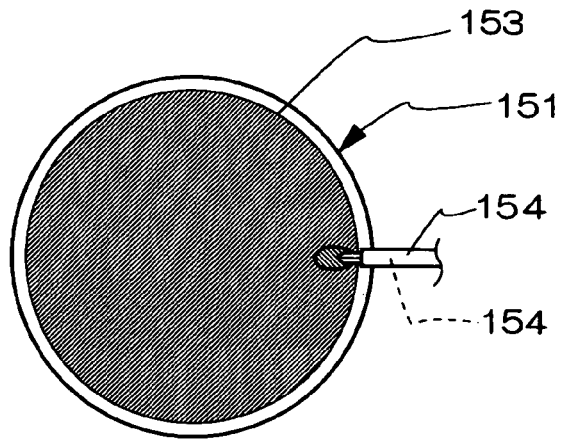
FIG. 6A is a plan view illustrating an example of a heating element formed in a flat plate-like shape according to the embodiments.
Figure 6B:
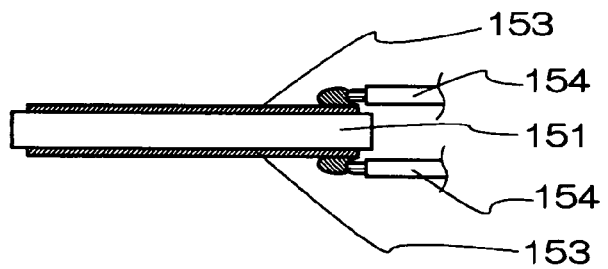
FIG. 6B is a sectional view illustrating the example of the heating element.
Figure 6C:
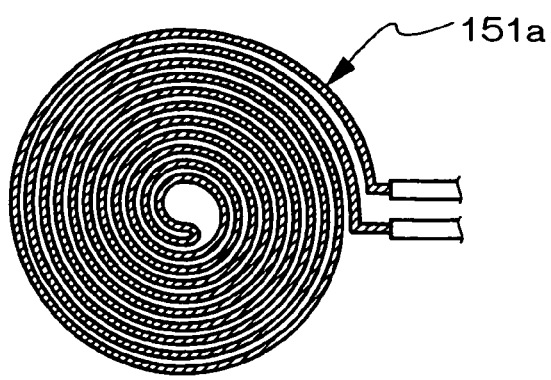
FIG. 6C is a plan view illustrating an example of a heating element formed in a spiral shape according to the embodiments.
Figure 7:
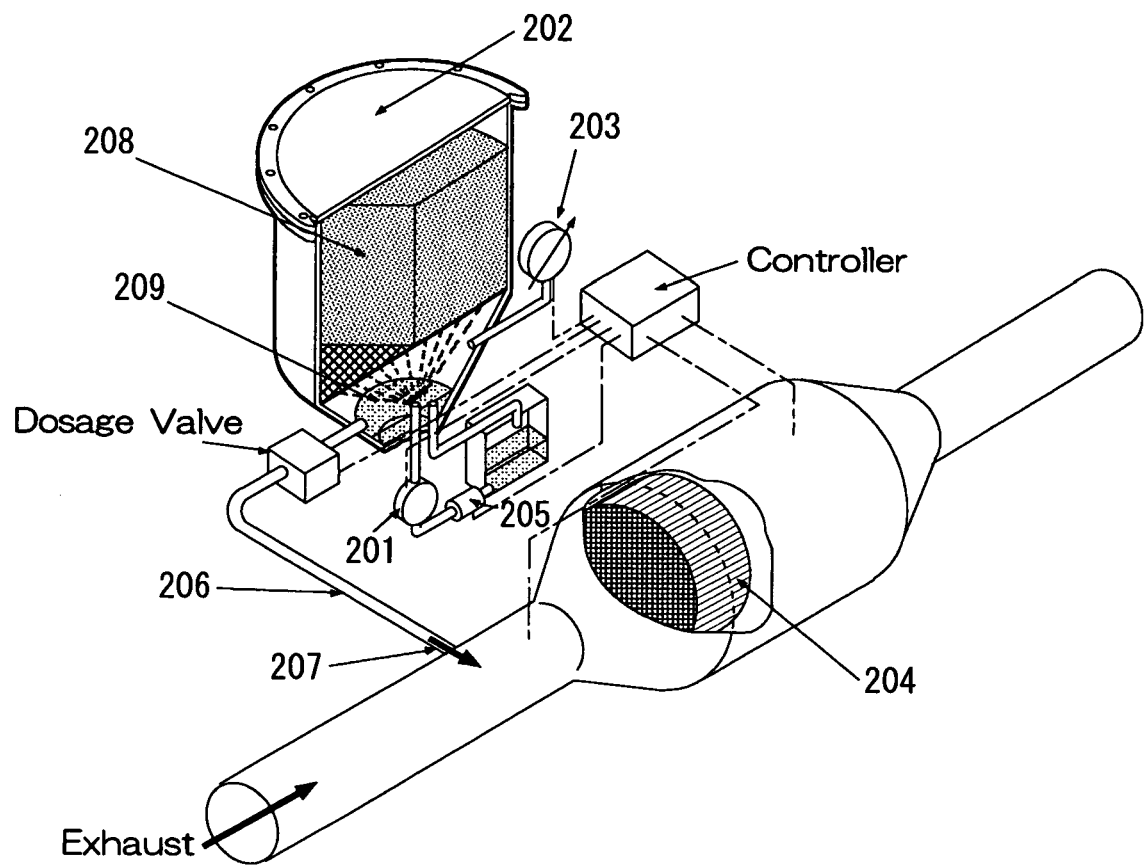
FIG. 7 is a perspective view illustrating a configuration of a conventional solid urea SCR system.

Specific examples of the heating element 151 and a heating element 151a employed in the present embodiments are shown in FIGS. 6A to 6C, respectively. The heating element 151 is a disk-shaped heating element formed from PTC ceramics. Electrodes 153 made of ohmic silver or the like are formed on upper and lower surfaces of the heating element 151. A pair of lead wires 154 is connected respectively to the electrodes 153. The PTC ceramics have a self-temperature control function because of PTC characteristics. According to the PTC characteristics, the entire surface of the PTC ceramics, on which the electrodes 153 are formed, evenly generates heat upon energization between the electrodes 153. When a heat generation temperature reaches a Curie point inherent in the PTC ceramics, internal resistance of the heating element 151 increases rapidly and thereby a current does not pass through the PTC ceramics. Thus, the PTC ceramics have the self-temperature control function of stopping the temperature rise of the PTC ceramics. By using the PTC ceramics heating element having a Curie point that accords with a sublimation temperature of the solid reductant 20, the heat generation temperature does not need to be measured. Consequently, an amount of the reducing gas 21 generated is controlled using an even more simplified configuration.

As shown in FIG. 6C, by forming the heating element 151a in a spiral shape using a sheathed heater or a nichrome wire heater, temperature distribution on its heat generating surface is equalized.

The invention is not limited to the above embodiments, and can be appropriately modified without departing from the scope of the invention. For example, in the above embodiments, diammonium acid carbonate carbamate is used for the solid reductant 20. However, when the heat generation temperature of the heating element is suited to the sublimation temperature of the solid reductant 20, the other materials enumerated in the table 1 are applied to the solid reductant 20. Furthermore, the heating element is not limited to the examples shown in FIGS. 6A to 6C. Any structure that generates heat upon energization to heat the lower surface of the solid reductant 20 evenly may be used as the heating element.

Additional advantages and modifications will readily occur to those skilled in the art. The invention in its broader terms is therefore not limited to the specific details, representative apparatus, and illustrative examples shown and described.

What is claimed is:

1. A reducing gas generator for generating reducing gas including ammonia from a solid reductant formed in a columnar shape having a generally constant cross-section perpendicular to a central axis along an axial length of the solid reductant, the generator comprising:

a heat-generating portion that includes a heat-generating surface opposed to a lower surface of the solid reductant in a vertical direction thereof and in contact with an entire region of the lower surface; and a heating element that heats the heat-generating surface when energized, so that the solid reductant is heated and decomposed to generate the reducing gas;

a solid reductant receiving portion, which receives the solid reductant such that an axial direction of the solid reductant is perpendicular to the heat-generating surface and that a contact position between the solid reductant and the heat-generating surface is maintained, wherein:

the solid reductant receiving portion is formed in a cylindrical shape;

the solid reductant receiving portion having a side wall and a bottom wall which are formed at least in part from a porous body, through which the reducing gas permeates;

an air-tight pressure vessel container disposed around the solid reductant receiving portion, wherein the reducing gas, which is generated when the solid reductant is heated by the heat-generating portion, is stored in the container;

a reducing gas lead-out hole formed at an upper portion of the container and conducting reducing gas out of the container;

a ventilation passage formed between the solid reductant receiving portion and an inner wall of the container for conducting reducing gas into the reducing gas lead-out hole; and ventilation means allowing reducing gas generated at a contact surface between the solid reductant and the heat-generating surface to flow into the ventilation passage through the side and bottom walls of the solid reductant receiving portion.

2. The reducing gas generator according to claim 1, wherein:

the heat-generating surface includes an inside surface of the bottom wall of the solid reductant receiving portion; and the ventilation means includes:

at least one bottom wall groove portion formed on the bottom wall inside surface in a radially outward direction from a center of the bottom wall inside surface;

at least one side wall groove portion formed on an inner circumferential surface of the side wall of the solid reductant receiving portion in a direction from a lower end toward upper end of the side wall in the vertical direction so as to communicate with the at least one bottom wall groove portion, respectively; and a side surface opening which is formed at an upper portion of the solid reductant receiving portion in the vertical direction and through which an inside and outside of the solid reductant receiving portion communicate, wherein the side surface opening communicates with one of the at least one side wall groove portion.

3. The reducing gas generator according to claim 1, further comprising a solid reductant pressing means for pressing the lower surface of the solid reductant on the heat-generating surface according to a volume decrease of the solid reductant due to the decomposition of the solid reductant.

4. The reducing gas generator according to claim 3, wherein the solid reductant pressing means is one of a spring and a hydraulic system disposed inside the container.

5. The reducing gas generator according to claim 3, wherein:

the inner wall of the container, an inner wall of the solid reductant receiving portion, and an upper surface of the solid reductant define a solid reductant back pressure space; and the solid reductant pressing means presses the solid reductant using a pressure of gas in the solid reductant back pressure space including the reducing gas conducted into the solid reductant back pressure space by the ventilation means.

6. The reducing gas generator according to claim 1, further comprising:

a pressure meter for detecting a pressure of the reducing gas in the container;

a gas concentration meter for detecting a concentration of a specific gas component of the reducing gas in the container; and a control means for calculating how much the solid reductant is heated based on the detected pressure and concentration of the specific gas component and controlling the energization of the heating element of the heat-generating portion.

7. The reducing gas generator according to claim 1, further comprising a solid reductant consumption monitor configured to monitor a consumed amount of the solid reductant.

8. The reducing gas generator according to claim 1, wherein the solid reductant includes at least one of diammonium acid carbonate carbamate, ethyl carbamate, ammonium carbonate, ammonium hydrogencarbonate, ammonium phosphate, ammonium hydrogenphosphate, ammonium dihydrogenphosphate, ammonium acetate, ammonium stearate, and ammonium formate.

9. A reducing gas generator as in claim 1 disposed in a solid reductant SCR system for reducing nitrogen oxide in exhaust gas flowing through an exhaust gas flow passage of an internal combustion engine using the reducing gas so as to remove the nitrogen oxide from the exhaust gas, the system comprising:

an SCR catalyst disposed in the exhaust gas flow passage;
the reducing gas generator being connected to the SCR catalyst, wherein the reducing gas generated by the reducing gas generator is introduced to an upstream side of the SCR catalyst in the exhaust gas flow passage in a flow direction of the exhaust gas; and
a reducing gas introduced flow control means for controlling a flow of the reducing gas introduced to the upstream side of the SCR catalyst.

10. The solid reductant SCR system according to claim 9, wherein the reducing gas introduced flow control means includes:
   a control valve configured to open and close the reducing gas lead-out hole; and
   a press pump disposed between the reducing gas lead-out hole and the control valve for amplifying a pressure of the reducing gas, which is conducted out of the reducing gas generator by the reducing gas lead-out hole.

11. The solid reductant SCR system according to claim 9, further comprising:
   a first gas concentration sensor disposed on the upstream side of the SCR catalyst for detecting a concentration of a specific gas component of the exhaust gas; and
   a second gas concentration sensor disposed on a downstream side of the SCR catalyst in the exhaust gas flow passage in the flow direction of the exhaust gas and configured to detect a concentration of the specific gas component, wherein the control means corrects an amount of the reducing gas conducted out of the reducing gas generator via the reducing gas introduced flow control means based on the concentrations detected by the first and second gas concentration sensors.

12. A reducing gas generator for generating reducing gas including ammonia from a solid reductant formed in a columnar shape having a generally constant cross-section perpendicular to a central axis along an axial length of the solid reductant, the generator comprising:
   a heat-generating portion that includes a heat-generating surface opposed to a lower surface of the solid reductant in a vertical direction thereof and in contact with an entire region of the lower surface; and a heating element that heats the heat-generating surface when energized, so that the solid reductant is heated and decomposed to generate the reducing gas;
   a solid reductant receiving portion, which receives the solid reductant such that an axial direction of the solid reductant is perpendicular to the heat-generating surface and that a contact position between the solid reductant and the heat-generating surface is maintained, wherein:
   the solid reductant receiving portion is formed in a cylindrical shape;
   the solid reductant receiving portion having a side wall and a bottom wall which are formed at least in part from a porous body, through which the reducing gas permeates;
   an air-tight pressure vessel container disposed around the solid reductant receiving portion, wherein the reducing gas, which is generated when the solid reductant is heated by the heat-generating portion, is stored in the container;
   a reducing gas lead-out hole formed at an upper portion of the container and conducting reducing gas out of the container;
   a ventilation passage formed between the solid reductant receiving portion and an inner wall of the container for conducting reducing gas into the reducing gas lead-out hole;
   ventilation means allowing reducing gas generated at a contact surface between the solid reductant and the heat-generating surface to flow into the ventilation passage through the side and bottom walls of the solid reductant receiving portion; and
   a solid reductant consumption monitor configured to monitor a consumed amount of the solid reductant;
   wherein:
   the solid reductant consumption monitor includes a pair of electrodes consisting of an upper electrode in contact with the upper surface of the solid reductant and a lower electrode, which has the heat-generating surface and is in contact with a lower surface of the solid reductant receiving portion; and
   the solid reductant consumption monitor outputs an alarm or stops a power supply to the heat-generating portion when one of resistance and capacitance between the pair of electrodes varying according to the consumed amount of the solid reductant is equal to or smaller than a predetermined threshold value.

13. The reducing gas generator according to claim 12, wherein the bottom wall of the solid reductant receiving portion is the lower electrode.

14. A reducing gas generator for generating reducing gas including ammonia, the generator comprising:
   a solid reductant receiving portion retaining a solid reductant in a columnar shape, having a constant cross-section perpendicular to a central axis of the solid reductant;
   a heat-generating portion that includes a heat-generating surface opposed to a lower surface of the solid reductant and in contact with an entire region of the lower surface; and a heating element that heats the heat-generating surface when energized, so that the solid reductant is heated and decomposed to generate the reducing gas; and
   a solid reductant consumption monitor configured to monitor a consumed amount of the solid reductant, wherein:
   the solid reductant consumption monitor includes a pair of electrodes including an upper electrode in contact with the upper surface of the solid reductant and a lower electrode, which has the heat-generating surface and is in contact with a lower surface of the solid reductant receiving portion; and
   the solid reductant consumption monitor outputs an alarm or stops a power supply to the heat-generating portion when one of resistance and capacitance between the pair of electrodes varying according to the consumed amount of the solid reductant is equal to or smaller than a predetermined threshold value.

15. The reducing gas generator according to claim 14, wherein the bottom wall of the solid reductant receiving portion is the lower electrode.

* * * * *